United States Patent [19]
Jerraid

[11] Patent Number: 6,000,134
[45] Date of Patent: Dec. 14, 1999

[54] APPARATUS AND METHOD FOR PRELOADING ANTIFRICTION BEARINGS

[76] Inventor: Jack V. Jerraid, 2902 Overlook Dr., Fort Wayne, Ind. 46808

[21] Appl. No.: 09/049,432

[22] Filed: Mar. 27, 1998

[51] Int. Cl.⁶ .............................. B23P 11/00; B23D 53/10
[52] U.S. Cl. ..................................... 29/898.09; 29/407.02; 29/446
[58] Field of Search ........................... 29/898.09, 407.02, 29/446

[56] References Cited

U.S. PATENT DOCUMENTS

| | | |
|---|---|---|
| 1,748,973 | 3/1930 | Buckwalter . |
| 2,101,130 | 7/1937 | Christman . |
| 2,762,112 | 9/1956 | Kylen . |
| 2,911,855 | 11/1959 | Opocensky . |
| 3,672,019 | 6/1972 | Barnbrook et al. . |
| 3,695,391 | 10/1972 | Munnich et al. . |
| 3,726,576 | 4/1973 | Barnbrook et al. . |
| 3,785,023 | 1/1974 | Harbottle . |
| 3,830,633 | 8/1974 | Harbottle . |
| 4,033,644 | 7/1977 | Reneerkens . |
| 4,150,468 | 4/1979 | Harbottle . |
| 4,172,621 | 10/1979 | Yoshida . |
| 4,179,786 | 12/1979 | Eshghy . |
| 4,219,920 | 9/1980 | Eshghy . |
| 4,219,921 | 9/1980 | Eshghy . |
| 4,219,922 | 9/1980 | Eshghy . |
| 4,406,179 | 9/1983 | Numazawa et al. ........................ 74/740 |
| 4,492,018 | 1/1985 | Rode . |
| 4,519,734 | 5/1985 | Mitchell et al. .......................... 409/231 |
| 5,115,558 | 5/1992 | Bernhardt et al. ......................... 29/705 |
| 5,125,156 | 6/1992 | Witte . |
| 5,159,754 | 11/1992 | Vancsik . |
| 5,215,270 | 6/1993 | Udocon et al. ............................ 29/407 |
| 5,291,645 | 3/1994 | Aoyama .................................... 29/407 |
| 5,328,269 | 7/1994 | Mutolo et al. . |
| 5,386,630 | 2/1995 | Fox . |
| 5,442,854 | 8/1995 | Koltookian . |
| 5,502,883 | 4/1996 | Ohmi et al. ........................... 29/407.02 |
| 5,579,570 | 12/1996 | Bonvallet ................................... 29/724 |

Primary Examiner—David P. Bryant
Assistant Examiner—Essama Omgba
Attorney, Agent, or Firm—George Pappas

[57] ABSTRACT

An apparatus and method for preloading roller bearings which rotatably support a pinion shaft in a differential gear assembly includes a drive mechanism which selectively engages and rotatably drives the yoke of the differential gear assembly in a counterclockwise direction as viewed from the pinion shaft threaded end. A dead shaft engages the pinion shaft nut and rotates therewith. A brake is coupled to and selectively restrains or allows the dead shaft to rotate with the nut. Preventing the dead shaft and nut from rotating causes the nut to be threadingly received onto the pinion shaft and load the bearings. Disengaging the brake and allowing free rotation of the dead shaft and nut allows sensing of the bearing preload condition within the differential gear assembly housing.

12 Claims, 5 Drawing Sheets

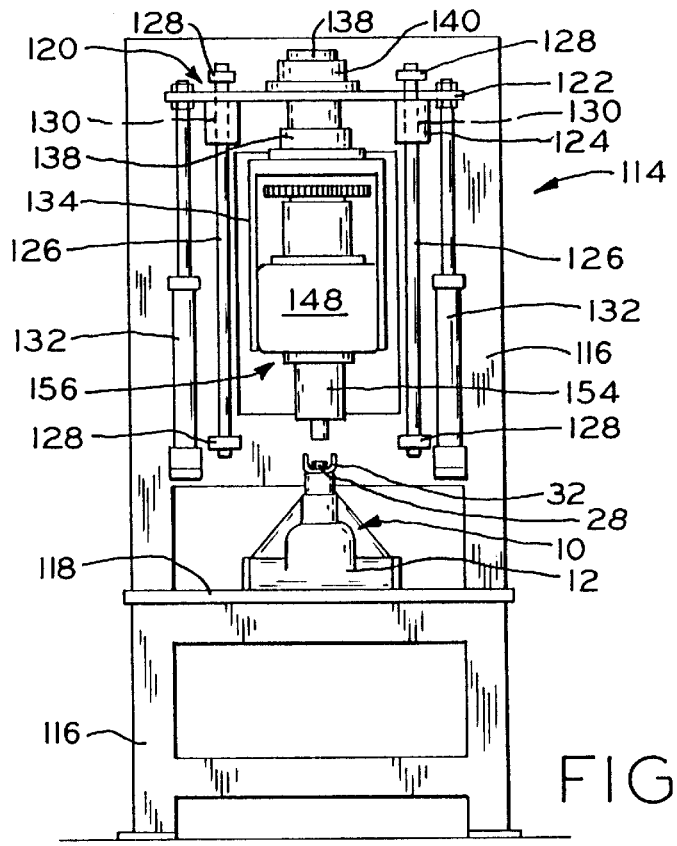
FIG_1
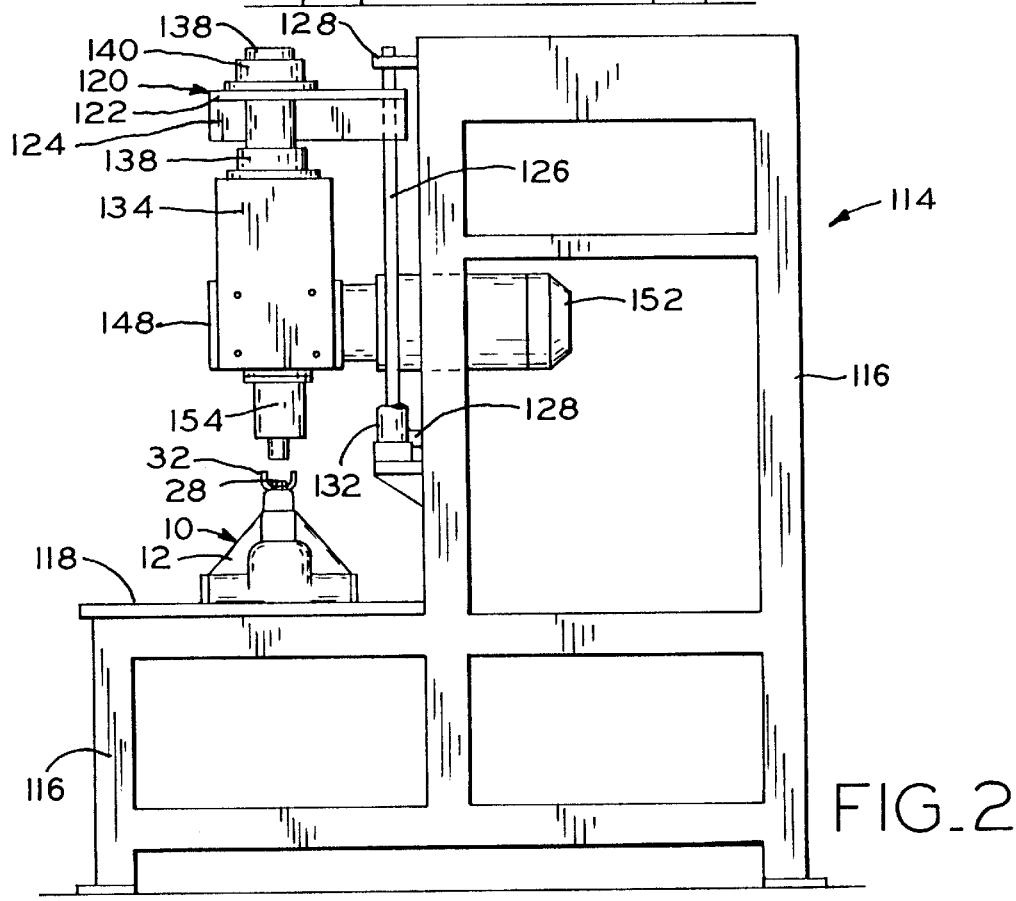
FIG_2

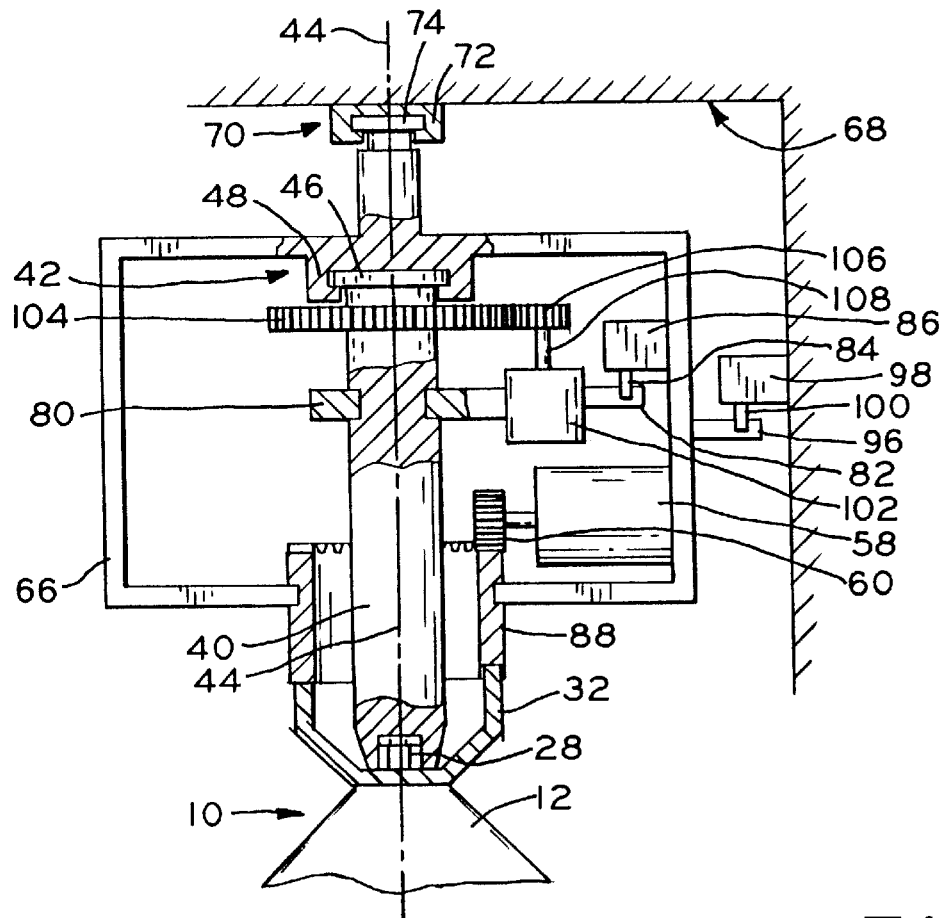
FIG_7A
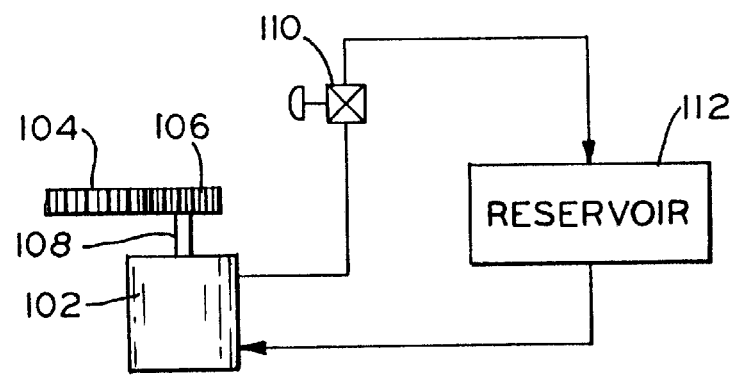
FIG_7B

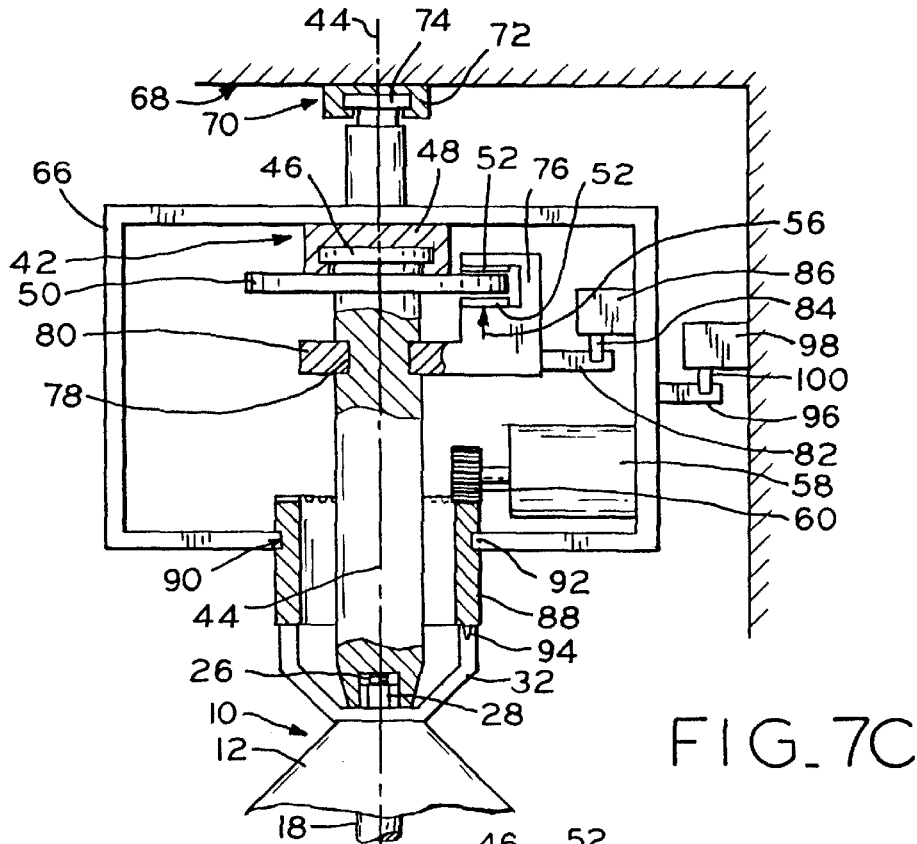
FIG_7C
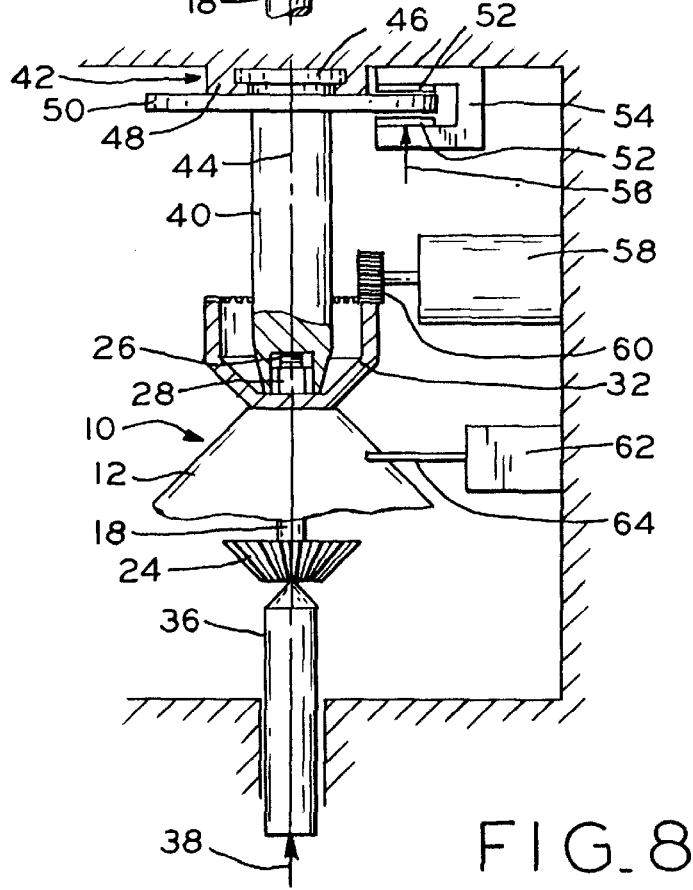
FIG_8

APPARATUS AND METHOD FOR PRELOADING ANTIFRICTION BEARINGS

TECHNICAL FIELD

The present invention relates to the technical field of apparatus and methods for preloading antifriction bearings. More specifically, the present invention relates to an apparatus and method for preloading an antifriction bearing set that supports a pinion shaft in a differential gear assembly.

BACKGROUND OF THE INVENTION

It is currently known and quite common to preload tapered roller bearings/antifriction bearings that rotatably support a pinion shaft in a differential gear assembly. Such differential gear assemblies are typically used in vehicles for delivering torque to the driven wheels. The engine typically delivers its torque through a transmission to a drive shaft which is coupled to the pinion shaft in the differential housing. The pinion shaft then delivers the torque in a known and customary manner to the drive axle connected to the driven wheels.

The pinion shaft is mounted and supported in the differential housing with a pair of tapered antifriction roller bearings. It is desirable to preload the tapered antifriction roller bearings to eliminate play or axial and radial free motion between the shaft, bearings and housing. The bearing preload is determined by measuring the torque required to rotate the pinion shaft and bearings within the housing. This bearing preload must be enough to prevent the bearings from gaining play and must not be so great so as to cause the bearings to overheat. Thus, a proper preload condition is required for maximizing the life of the pinion shaft and differential gear assembly. Depending on the size of the differential gear assembly, type of bearing assembly, materials, etc., the manufacturer determines the ideal preload value for maximizing the life of the differential gear assembly.

Various apparatus and methods have been devised and are in use for preloading tapered antifriction roller bearings. One such method is described in Witte, U.S. Pat. No. 5,125,156 wherein, after a pinion shaft and bearings are assembled in the housing, the assembly is placed in an upright condition with the pinion shaft gear facing downwardly and the pinion threaded end, nut and yoke extending vertically upwardly. In this position, the pinion gear rests on a rotatable support and a torque sensor restrains rotational motion of the assembly housing. The yoke is coupled to a drive head and is rotatably driven along with the pinion shaft in a clockwise direction. The nut is engaged with a socket which is also rotated clockwise at a slightly greater angular velocity thereby tightening the nut onto the pinion shaft and causing a spacer on the pinion shaft between the bearings to collapse and the bearings to be preloaded. Thereafter, by simultaneously rotatably driving both the yoke and pinion shaft along with the nut at the same clockwise angular velocity, a sensor which is located so as to restrain rotational motion of the housing provides an output reading which is proportional to the pinion preload condition.

Another method for preloading tapered antifriction roller bearings is described in Bonvollet U.S. Pat. No. 5,579,570 wherein, again, after a pinion shaft and bearings are assembled, the housing assembly is placed in an upright condition with the pinion shaft threaded end, nut and yoke extending vertically upwardly. Here however, the pinion shaft gear is not rotatably supported. A low torque drive assembly is coupled to the yoke so as to rotatably drive the yoke and pinion shaft in a clockwise direction. A high torque drive assembly is supported on the low torque drive assembly and engages and rotates the nut in a clockwise direction at a slightly greater clockwise angular velocity thereby tightening the nut onto the pinion shaft and causing the spacer on the pinion shaft between the bearings to collapse and the bearings to be preloaded. The high torque drive assembly is supported on the low torque drive assembly and is prohibited from independent movement relative to the low torque drive assembly. A sensor restrains the low torque drive assembly from rotation relative to the housing. By simultaneously rotating both the low torque drive assembly and the high torque drive assembly at the same speed in a clockwise direction, after the nut and bearings have been tightened, the sensor output is representative of the bearings preload condition.

As can be appreciated, although these prior apparatus and methods suffice in driving the pinion nut, tightening the bearings and measuring the preload condition of the bearings, they have shortcomings and drawbacks. Substantial effort in controlling the nut driving assembly at a slightly greater angular velocity than the yoke driving assembly is required. Further, during pinion preload measuring, the yoke and drive nut assemblies must rotate substantially precisely at the same angular velocity in the clockwise direction or risk potential inadvertent tightening and unwanted increase preload of the bearings. Accordingly, a need exists for an apparatus and method for preloading an antifriction bearings set which can relatively easily and inexpensively be controlled for driving the nut onto the pinion shaft and tightening the antifriction bearings to a preload condition and which operates efficiently and reliably in achieving the desired preload condition.

SUMMARY OF THE INVENTION

It is the principal object of the present invention to overcome the above discussed disadvantages associated with prior apparatus and methods for preloading antifriction bearings and antifriction bearings sets that support pinion shafts in a differential gear assembly.

The present invention overcomes the disadvantages associated with prior apparatus and methods for preloading antifriction bearings by providing a drive mechanism which is adapted to selectively engage and rotatably drive the yoke and the bearing shaft in a counterclockwise direction as viewed from the bearing shaft threaded end. A dead shaft is adapted to selectively engage the nut and to rotate therewith. Thus, after a pinion shaft and bearings are assembled in the differential gear housing, the assembly is placed in an upright position with the pinion shaft gear facing downwardly and the pinion threaded end, nut and yoke extending vertically upwardly whereat the drive mechanism is coupled to the yoke and the dead shaft engages the nut. A brake is coupled to the dead shaft and selectively allows and prevents rotation of the dead shaft. In operation, the drive mechanism drives the yoke and bearing shaft in a counterclockwise direction and the brake is selectively engaged and disengaged so as to also selectively cause the dead shaft and nut to either stop/slow down rotation in relation to the bearing shaft or to rotate therewith. By engaging the brake and preventing rotation of the dead shaft, the nut is caused to be threadingly received onto the bearing shaft thereby causing the spacer between the bearings to collapse and the bearing themselves to be tightened/placed in a preload condition. By disengaging the brake the dead shaft and nut are allowed to rotate with the bearing shaft and yoke, thereby preventing further tightening of the nut onto the bearing shaft.

In one embodiment, a selectively longitudinally vertically movable lift pin is adapted to engage the bearing shaft end opposite the threaded end which is typically the pinion gear end and to lift the bearing shaft, bearings and housing so as to allow free rotation of the bearing shaft within the housing. A sensor is provided in engagement with the differential gear assembly housing so as to restrain rotational movement of housing and, thereby, providing a signal proportional to the friction between the bearing shaft and the housing representative of the preload condition of the bearings. For measuring the bearing preload condition, the brake is merely disengaged allowing the dead shaft and nut to be rotatably driven by the drive mechanism along with the bearing shaft.

In another embodiment, the drive mechanism, dead shaft and brake are supported and carried by a carriage which is rotatably supported by a platform. The carriage is adapted to rotate about an axis of rotation which is substantially collinear with the dead shaft axis of rotation. A lift mechanism is coupled to the platform so as to selectively lift the platform and carriage in a manner whereby a differential gear assembly can be placed thereunder and the drive mechanism and dead shaft lowered thereon for selective placement in engagement with the yoke and nut respectively. A sensor is located between the brake and the drive mechanism and has an output which is proportional to the torque therebetween thereby providing a signal representative of the torque between the nut and the bearing shaft. Another sensor is provided and is adapted to engage and restrain the carriage from rotational movement thereby providing a signal which is proportional to the friction between the bearing shaft and the differential gear assembly housing.

The brake can include friction pads which selectively engage the dead shaft so as to thereby selectively allow or prevent rotation thereof Alternatively, a disk is coupled to the dead shaft for rotation therewith and friction pads are provided for selectively engaging the disk thereby selectively allowing or preventing rotation of the dead shaft. In another alternative embodiment, the brake includes a positive displacement fluid pump coupled to and being driven by the dead shaft and a fluid valve coupled to the positive displacement fluid pump. The dead shaft drives the pump and the fluid is pumped and circulates between the pump and the valve. By selectively closing the valve, the pump is prevented from rotating thereby also selectively braking and preventing the dead shaft from rotating.

In one form thereof, the present invention is directed to an apparatus for preloading a set of antifriction bearings supporting a bearing shaft in a housing. The shaft has a threaded end adapted to threadingly receive a nut by rotating the nut in a clockwise direction as viewed from the shaft threaded end. A yoke is coupled to the bearing shaft and is adapted to rotate therewith. The apparatus for preloading the set of bearings includes a drive mechanism adapted to selectively engage and rotatably drive the yoke and the bearing shaft in a counterclockwise direction as viewed from the bearing shaft threaded end. A dead shaft is provided and is adapted to selectively engage the nut and rotate therewith. A brake is coupled to the dead shaft and selectively allows and prevents rotation of the dead shaft. When the dead shaft is engaged with the nut and the drive mechanism is engaged with and is rotatably driving the yoke, engagement of the brake and preventing rotation of the dead shaft and nut causes the nut to be threadingly received onto the bearing shaft. Disengagement of the brake and allowing rotation of the dead shaft and the nut allows the dead shaft and nut to rotate with the bearing shaft and yoke.

In one form thereof, the present invention is directed to a process of preloading a set of antifriction bearings including a bearing shaft supported by the bearings in a housing. The shaft has a threaded end adapted to threadingly receive a nut by rotating the nut in a clockwise direction as viewed from the shaft threaded end. A yoke is coupled to the bearing shaft and is adapted to rotate therewith. The process of preloading the antifriction bearings includes the steps of rotatably driving the yoke and bearing shaft in a counterclockwise direction as viewed from the bearing shaft threaded end and selectively preventing the nut from rotating with the bearing shaft and thereby causing the nut to be threadingly received onto the bearing shaft and preloading the antifriction bearings.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with accompanying drawings wherein:

FIG. 1 is a front elevation view of an apparatus constructed in accordance with the principles of the present invention for preloading antifriction bearings that support a pinion shaft;

FIG. 2 is a side elevation view of the apparatus shown in FIG. 1;

FIG. 7A, is a diagrammatic elevation view depicting one embodiment of an apparatus incorporating a drive mechanism, dead shaft and brake in accordance with the principles of the present invention;

FIG. 7B is a diagrammatic view of the brake shown in FIG. 7A;

FIG. 7C is a diagrammatic view of an apparatus similar to that depicted in FIG. 7A but incorporating a friction brake in accordance with the principles of the present invention; and, FIG. 8 is a diagrammatic view of another embodiment of an apparatus for preloading a set of antifriction bearings constructed in accordance with the principles of the present invention.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENTS

Figure 3:
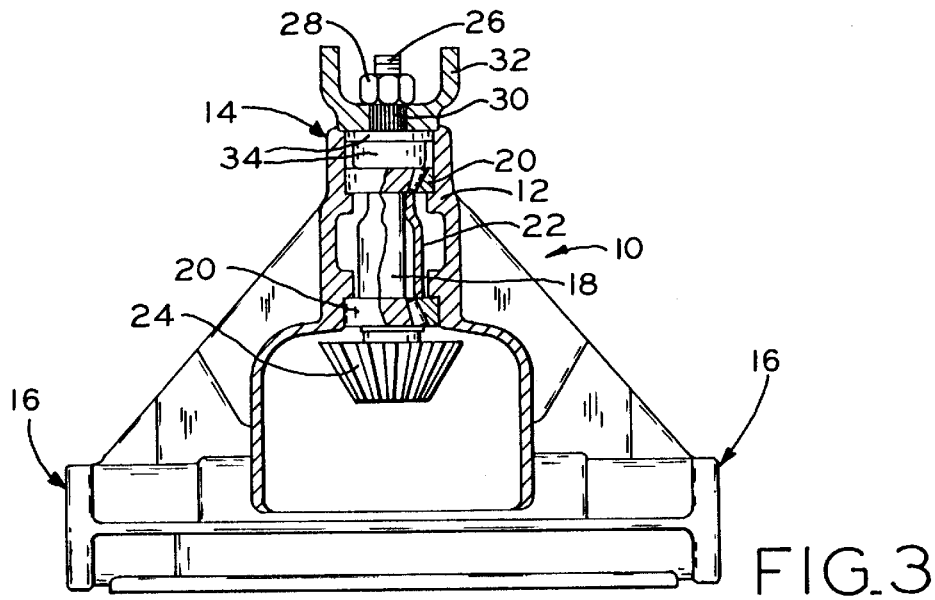
FIG. 3 is a partial cross-sectional view of a differential gear assembly housing supporting a pinion shaft with a set of antifriction bearings which can be preloaded in accordance the principles of the present invention.

Referring initially to FIG. 3, a differential gear assembly is generally designated by the numeral 10. Differential gear assembly 10 includes a housing 12 having a pinion shaft end 14 for receiving a pinion shaft 18 therethrough and wheel axle shaft ends 16 for receiving the wheel drive shafts therethrough (not shown). Pinion shaft 18 is supported within housing 12 with a pair of tapered roller bearings/antifriction bearings 20 in a known and customary manner. A collapsible sleeve 22 is located between the roller bearings 20.

The pinion shaft 18 at one end thereof, as shown, is provided with a pinion gear 24 adapted to mesh with gears (not shown) for providing torque and driving the wheel axle shafts. At its other end 26, the pinion shaft 18 is threaded for threadingly receiving thereon a nut 28 by rotating nut 28 in a clockwise direction. The pinion shaft 18 is further provided with a spline section 30 for receiving a yoke 32 thereon, again, in a known and customary manner, so as to engage and longitudinally slide along the pinion shaft 18. The yoke 32 is also adapted to engage and be driven by a drive axle (not shown). One or more spacers 34 are located on the pinion shaft 18 between the yoke 32 and the upper bearing 20.

So as to preload the antifriction bearings 20, after the differential gear assembly 10 is assembled as generally shown in FIG. 3, the nut 28 is tightened onto the threaded end 26 of the pinion shaft 18. This creates a compressive force which initially causes spacer 22 to collapse in a known and customary manner. Further tightening of nut 28 on threaded end 26 further longitudinally compresses the roller bearings 20 thereby preloading the bearings. The bearing preload is determined by measuring the torque required to rotate the pinion shaft 18 via the yoke 32 after the pinion shaft nut 28 has been tightened.

The embodiment shiown diagrammatically in FIG. 8 of an apparatus for preloading a set of bearings in the differential gear assembly 10 includes a lift pin 36 which is selectively longitudinally vertically movable up and down by applying a force thereon as indicated by arrow 38. In use, a preassembled differential gear assembly 10 is located on the apparatus over the lift pin 36 and a force 38 is applied to the lift pin so as to cause the lift pin 36 to engage the pinion gear 24 as shown and lift the entire differential gear assembly 10 vertically upwardly as diagrammatically shown.

With the differential gear assembly 10 in the position shown in FIG. 8, a dead shaft 40 is received over and in engagement with the nut 28 of the differential gear assembly 10. Dead shaft 40 is vertically supported, for example, as shown diagrammatically by a coupling 42 in a manner whereby dead shaft 40 may freely rotate about the vertical axis 44. The diagrammatically depicted coupling 42 includes an upper disk section 46 connected to the dead shaft 44 which is received within an annular recess formed in the radial collar 48. A disk 50 is coupled or otherwise attached to the dead shaft 40 so as to rotate therewith about the vertical axis 44. Friction pads 52 are supported on jaw member 54 and are adapted so that, upon application of a braking force as depicted by arrow 56, friction pads 52 engage the disk 50 thereby selectively preventing or slowing down rotation of the disk 50 and dead shaft 40 about the vertical axis 44. It should be noted that as used herein and the appended claims, the terms preventing, restricting or stopping the dead shaft 40 are all intended to identify and describe both the selective complete stopping of all rotational motion of dead shaft 40 as well as merely slowing down the dead shaft 40 to a radial velocity which is slower than the pinion shaft radial velocity and which is not an absolute dead stop.

A drive mechanism is diagrammatically depicted as a motor 58 engaged with and driving a gear 60 which is engaged with gear teeth shown on the yoke 32. Motor 58 is driven in a clockwise direction as viewed from its drive shaft and gear 60 so that yoke 32 and pinion shaft 18 are driven in a counterclockwise direction as viewed from the top or from the pinion shaft threaded end 26. A sensor 62 including a probe 64 is provided and is adapted to come in contact with the differential gear assembly housing 12 so as to restrain the housing 12 from rotating with the pinion shaft 18. In operation, after the differential gear assembly 10 is lifted in position as shown in FIG. 8, the yoke 32 is driven in a counterclockwise direction by the motor 58 and, by selectively applying a brake force 56 and restraining or preventing rotation of the dead shaft 40, nut 28 is caused to be treadingly received onto the pinion or bearing shaft 18. By releasing the brake/friction pads 52 the dead shaft 44 and disk 50 are allowed to rotate with the nut 28 and also with the pinion shaft 18 and yoke 32. Further, by selectively applying a braking force 56, the nut 28 is threaded onto the pinion shaft 18 as desired so as to also tighten and preload the bearings supporting the pinion shaft 18. Further yet, by allowing the dead shaft 44 and disk 50 to rotate with the yoke 32 and pinion shaft 18, the sensor 62 which restrains the housing 12 from rotating therewith, provides a signal which is proportional to the preload condition of the bearings or the friction between bearing shaft 18 and housing 12. A braking force 56 is selectively applied as needed, incrementally or otherwise, until a proper preload condition is achieved and, thereafter, the differential gear assembly 10 is lowered out of engagement with the dead shaft 40 and the drive mechanism by merely lowering the lift pin 36. It should be noted that although in the diagrammatic depiction of FIG. 8 gear 60 is shown directly engaged with gear teeth on yoke 32, this is shown merely for illustrative purposes and that a yoke engaging cylinder would typically be use which is driven by a motor and which is adapted for engaging the actual yoke shape.

A second embodiment constructed in accordance with the principles of the present invention is diagrammatically shown in FIG. 7C. In this embodiment, a carriage 66 is provided and is rotatably supported on a platform 68 via a coupling 70 diagrammatically shown as including a disk section 74 which is connected to the carriage 66 and received within an annular recess formed on radial collar 72 attached to platform 68. Thus, carriage 66 is rotatable about vertical axis 44. Here, the dead shaft 40 is rotatably supported via the coupling 42 attached to carriage 66 and, as shown, is also rotatable about the same vertical axis 44.

Similar to the embodiment of FIG. 8, the disk 50 is connected to and rotates with dead shaft 40. However, the brake mechanism in this embodiment includes a jaw member 76 which is carried on and is rotatably supported by dead shaft 40. As shown, dead shaft 40 includes an annular recess 78 for receiving collar 80 therein thereby supporting jaw member 76 and also allowing jaw member 76 to rotate about the vertical axis 44. Jaw member 76 is restrained from rotating with dead shaft 40 via a stop 82 which extends therefrom and makes contact with a probe 84 of sensor 86 which is attached to carriage 66. The drive mechanism in this embodiment is diagrammatically depicted, again, with a motor 58 selectively driving a gear 60. Here however, the motor 58 is supported on and carried by the carriage 66. Gear 60 is in driving engagement with the gear teeth located at the upper longitudinal end of yoke driving cylinder 88. Yoke driving cylinder 88 includes an annular outer recess 90 receiving therein a collar portion 92 of carriage 66 thereby supporting the yoke driving cylinder 88 thereat as shown so as to also be rotatable about the vertical axis 44. Yoke driving cylinder 88 further includes an engagement tooth 94 adapted to engage the yoke 32 in a known and customary manner. So as to restrain carriage 66 from freely rotating about the vertical axis 44, a stop member 96 is attached to and extends from carriage 66 for engaging the probe 100 of sensor 98 which is attached to and is carried by the platform 68. Finally, platform 68 and, thus, carriage 66 is selectively liftable vertically up and down with a lift mechanism not shown in FIG. 7C, but which is described hereinbelow in connection with the most preferred embodiment.

In use and operation of the embodiment shown in FIG. 7C, the platform 68 along with carriage 66 is lifted vertically upwardly and down onto a differential gear assembly 10 such that the dead shaft 40 is engaged with nut 28 and the yoke driving cylinder 88 is engaged with the yoke 32 as shown. The motor 58 is energized for turning the gear 60 in a clockwise direction as viewed from the motor shaft and gear 60 thereby turning the yoke driving cylinder 88 along with yoke 32 and pinion shaft 18 in a counterclockwise direction as viewed from the top or pinion shaft threaded end 26. The rotational movement of pinion shaft 18 also causes the nut 28 threaded thereon along with the dead shaft 40 to rotate therewith unless restrained by the brake mechanism. In this regard, by selectively applying a braking force as depicted by arrow 56 and causing the friction pads 52 to engage disk 50, dead shaft 40 and nut 28 are restrained from turning thereby causing the nut to be threadingly received onto the pinion shaft 18. The torque being applied to nut 28 is monitored by a signal proportional to the torque between nut 28 and pinion shaft 18 which is provided by sensor 86. The tightening of nut 28 is selectively continued until the desired preload condition of the bearings is achieved. In this embodiment, because the housing 12 of the differential gear assembly 10 is restrained from rotating, the bearing preload or friction between the pinion shaft 18 and housing 12 causes the entire carriage 66 to rotate about the vertical axis 44 with a torque equivalent to the bearing preload. Thus, the bearing preload condition is sensed by the sensor 98 which provides a signal proportional to the friction between the pinion shaft 18 and housing 12 during both the times when brake mechanism is engaged and nut 28 is being threadingly driven onto the pinion shaft 18 and, also, when the brake mechanism is disengaged and the nut 28 and dead shaft 40 are allowed to rotate with the yoke 32 and pinion shaft 18.

The embodiment shown in FIGS. 7A and 7B is substantially similar to that shown in FIG. 7C except that the brake mechanism is replaced with a positive displacement fluid pump 102 such as a gear pump coupled to and driven by the dead shaft 40. Here, the coupling of the dead shaft 40 to the pump 102 is diagrammatically depicted by a larger gear 104 connected to and rotating with the dead shaft 40 about the vertical axis 44. Gear 104 meshes with and drives smaller gear 106 which is coupled to the drive shaft 108 of pump 102. As best seen in FIG. 7B, pump 102 is fluidly connected to a fluid valve 110 and a fluid reservoir 112. Thus, with fluid valve 110 in the opened position a generally incompressible fluid such as hydraulic oil is caused to circulate from pump 102 through fluid valve 110 to reservoir 1 12 and back to pump 102. Because the pump 102 is of the positive displacement type, selective closing of fluid valve 110 causes pump 102 to be restrained or to stop from rotating thereby selectively restraining or preventing gears 106 and 104 along with the dead shaft 40 and nut 28 from rotating.

Referring now to FIGS. 1–6, the preferred embodiment implementing the invention in accordance with the principles of the present invention as also diagrammatically shown in FIG. 7A will be described. Here, the apparatus for preloading a set of bearings in a differential gear assembly is shown and generally depicted by the numeral 114. Apparatus 114 includes a support frame 116 including a table 118 whereupon a differential gear assembly 10 may be placed for preloading the bearings thereof After pre-assembly of the differential gear assembly 10 as shown in FIG. 3, the assembly is set on table 118 using a jig (not shown) or otherwise for preventing the housing 12 thereof from turning about the axis of the pinion shaft 18.

Apparatus 114 includes a platform 120 including a flat plate 122 and support legs 124. Plate 122 and legs 124 are slidingly supported on slide rods 126 which are attached at their upper and lower vertical ends to a frame 116 with brackets 128. Slide rods 126 are essentially received through bores 130 through plate 122 and legs 124 so that plate 122 is slidable vertically up and down. A pair of air cylinders 132 are attached at their lower ends to frame 116 and are attached at their upper ends to flat plate 122 of platform 120. Thus, by selectively extending and retracting air cylinders 132, platform 120 is selectively raised and lowered along slide rods 126.

Figure 4:
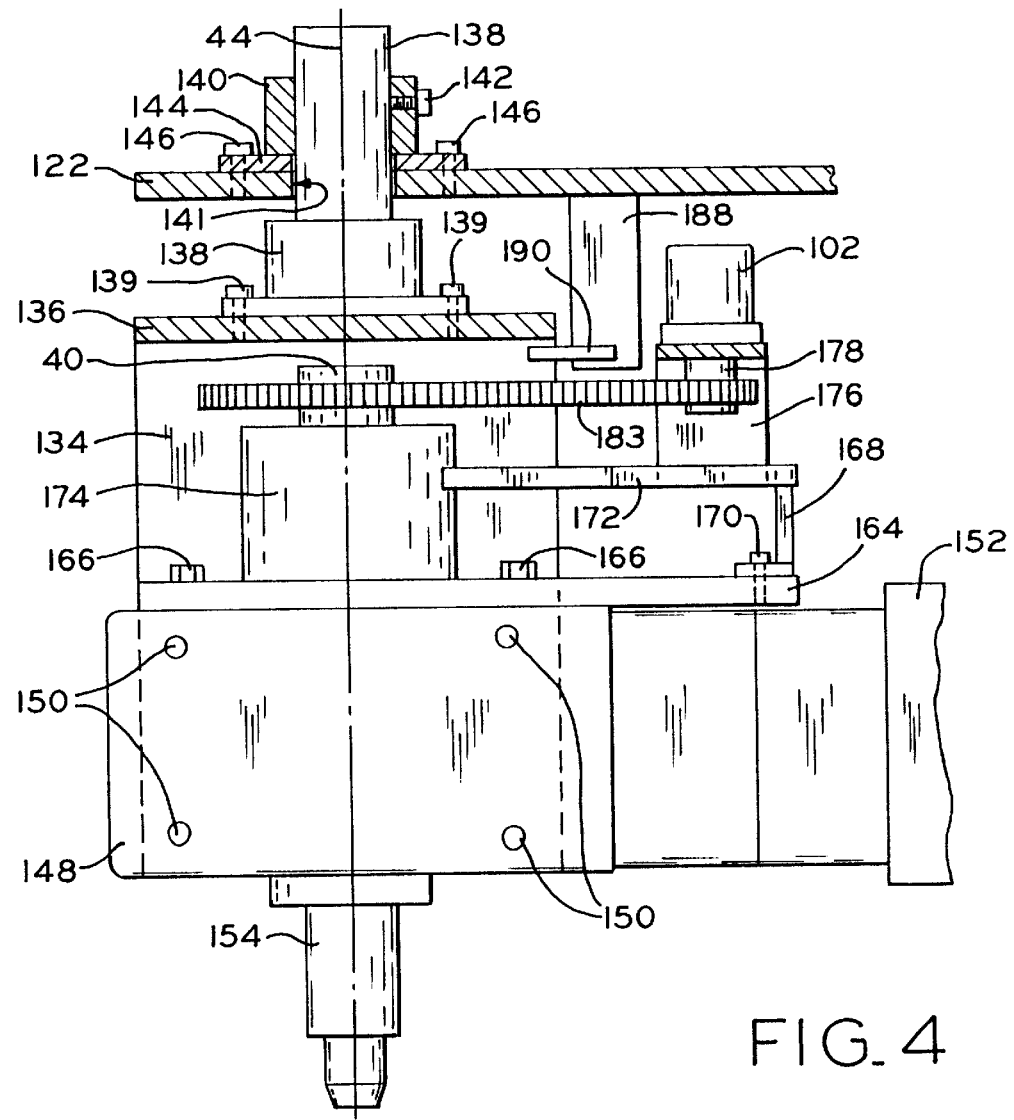
FIG. 4 is an enlarged side elevation view of the apparatus shown in FIG. 1 and showing a drive mechanism, dead shaft and brake supported on a carriage in accordance with the principles of the present invention.
Figure 5:
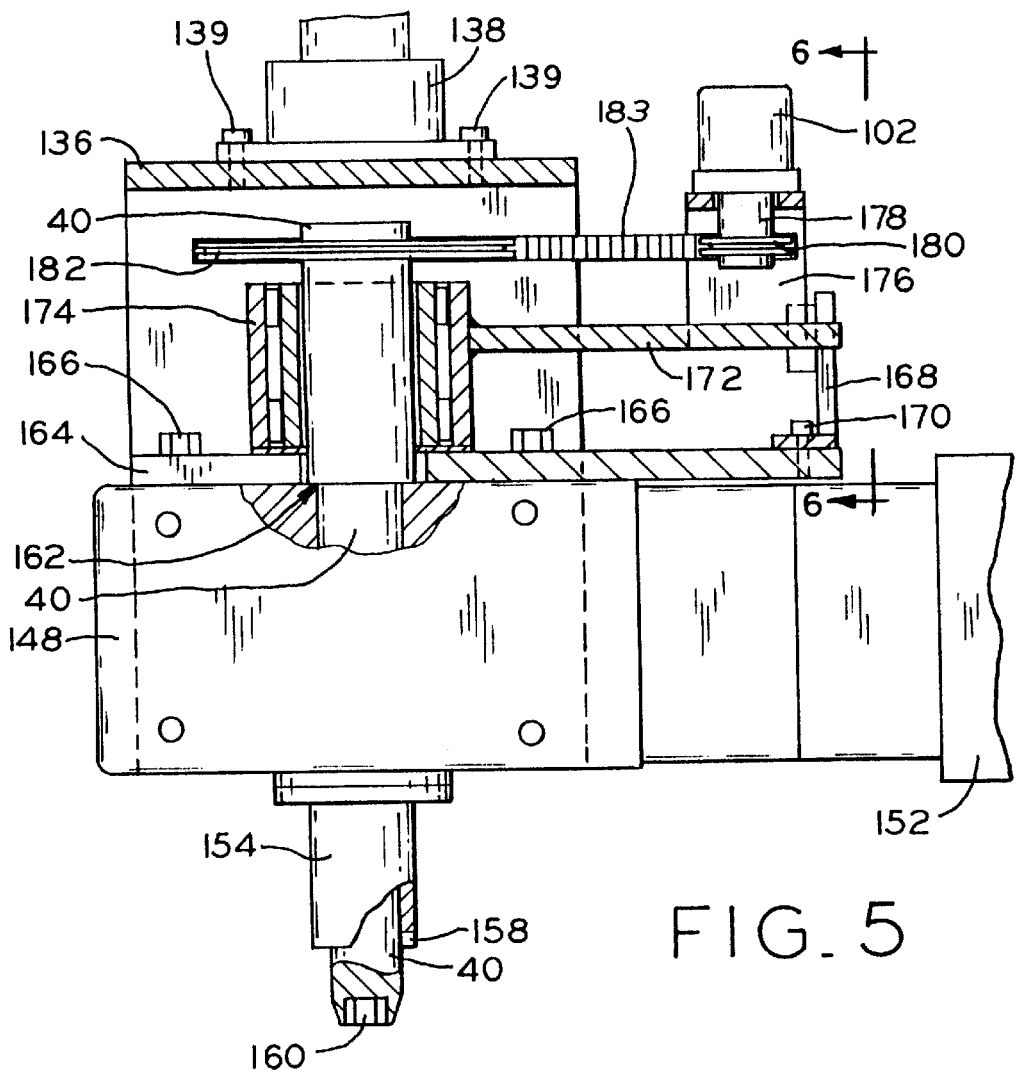
FIG. 5 is an enlarged side elevation view similar to FIG. 4 with partial cut-away sections and depicting the brake shown in FIG. 4.
Figure 6:
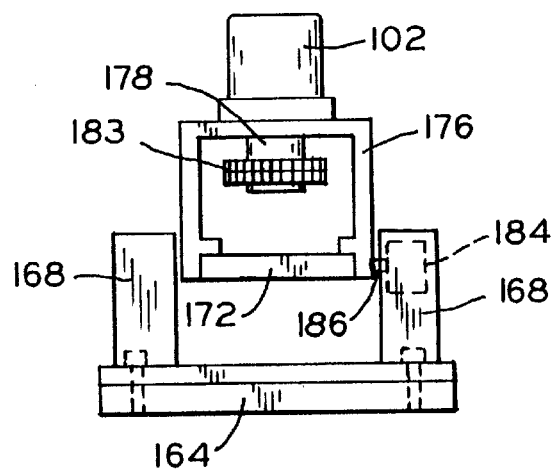
FIG. 6 is a view taken generally along line 6—6 in FIG. 5.

A carriage including a U-shaped member 134 is provided below and is rotatably supported by platform 120. As best seen in FIGS. 4 and 5, a support shaft member 138 is provided and attached to the upper portion 136 of U-shaped member 134 via screws 139. Support shaft member 138 includes an elongate upper section extending through a hole 141 in the flat plate 122 of platform 120 whereat a thrust bearing coupling 140 is received over and is rigidly affixed to the upper portion of the support shaft member 138 with a set screw 142. Thrust bearing coupling 140 bears against the thrust plate 144 attached to flat plate 122 with screws 146. Thus, support shaft member 138 vertically supports and retains the U-shaped member 134 in the position shown while allowing the U-shaped member 134 to rotate about the vertical axis 44.

Between the two vertically downwardly extending legs of the U-shaped member 134, a gearbox 148 is provided and supported with a plurality of screws 150. A motor 152 is coupled to gearbox 148 so as to provide rotational torque thereto. Motor and gearbox combinations of this character are commonly available and one such gearbox and motor called SM-Bevel BuddyBox is available through Sumitomo Machinery Corporation of America. The gearbox 148 is coupled to and drives the yoke driving cylinder 154 in a counterclockwise direction as viewed from the top. The dead shaft 40 extends through the gearbox 148 and yoke driving cylinder 154 but is not coupled thereto and is freely rotatable independent of the motor gearbox and yoke driving cylinder 154. As best seen in FIGS. 1 and 2, motor 152 extends through an opening 156 of frame 114. Opening 156 is sufficiently large enough so as not to interfere with the vertical motion of the motor 152 and U-shaped member 134 which are carried by and are also movable vertically up and down along with platform 120. At its lower end thereof, the yoke driving cylinder 154 is provided with a notch 158 or other similar or equivalent configuration so as to engage a yoke 32 of a differential gear assembly 10 and drive the yoke 32 in a counterclockwise direction as viewed from the top.

Dead shaft 40, as mentioned hereinabove, extends through the gearbox 148 and may rotate independent of the yoke driving cylinder 154. At its lower end, the dead shaft 40 includes a nut recess 160 sized appropriately for receiving therein and engaging a nut 28 of a differential gear assembly 10. An annular shoulder 162, a thrust bearing, or other equivalent structure is provided for preventing the dead shaft 40 from falling through the yoke driving cylinder 154. A stop arm 164 is provided on top of gearbox 148 and extends backwardly toward motor 152. Stop arm 164 is attached to gearbox 148 with screws 166. Stop fingers 168 are attached to arm 164 with screws 170 and extend vertically upwardly as shown. A reactor arm 172 is supported on bushing 174 received around dead shaft 40. Thus, reactor arm 172 is freely rotatable about the vertical axis 44. At the radial outer end of reactor arm 172 a positive displacement fluid pump 102 is supported and mounted via a frame assembly 176 which is rigidly affixed to reactor arm 172. Fluid pump 102 is connected to a valve and reservoir as described hereinabove. Pump 102 includes a driven shaft 178 whereupon there is attached a small sprocket 180. A corresponding larger sprocket 182 is attached to the dead shaft 40 for rotation therewith and a chain 183 extends between sprockets 180 and 182 thereby coupling dead shaft 40 to the driven shaft 178 of pump 102.

A first sensor 184 is attached to one of the stop fingers 168 and includes a probe 186 located and adapted to come in contact with reactor arm 172. Sensor 184 thus provides a signal output which is proportional to the torque between the dead shaft 40 and the yoke driving cylinder 154.

A second sensor 188 is attached to the flat plate 122 of the support platform 120 and includes a probe 190 which extends to and makes contact with the U-shaped member 134. The probe 190 restrains the U-shaped member 134 and all the components carried thereon from rotating about the vertical axis 44. The probe 190 and sensor 188 thus provide a signal output which is proportional to the torque being applied by the yoke driving cylinder 154 to rotate the pinion shaft 18 within the housing 12.

In operation, after a differential gear assembly 10 is placed on the table 118 of the apparatus 114, air cylinders 132 are deflated thereby lowering platform 120 and placing the yoke driving cylinder 154 in engagement with and coupled to the yoke 32 and the dead shaft 40 in engagement with and coupled to the nut 28. Motor 152 is then selectively energized causing the yoke driving cylinder 154 to rotatably drive the yoke 32 in a counterclockwise direction as viewed from the pinion shaft threaded end 26 or the top. By closing or restricting flow via the fluid valve 110, pump 102 restrains or prevents shaft 178 and thus dead shaft 40 from rotating thereby also selectively stopping or slowing down or intermittently stopping the nut 28 from rotating with the pinion shaft 18 and thereby also causing the nut 28 to be threadingly received onto the pinion shaft threaded end 26. The fluid valve 110 is selectively opened and closed so as to apply the desired torque on nut 28 as sensed by sensor 184. Torque being applied to the nut 28 is sensed by sensor 184 while fluid valve 110 is in the closed position. For measuring the preload condition of the differential gear assembly bearings, fluid valve 110 is opened thereby allowing the pump shaft 178 to freely rotate and also allowing the dead shaft 40 to rotate along with the yoke driving cylinder 154 and pinion shaft 18. Because housing 12 of the differential gear assembly 10 is prevented from rotating, the friction between the pinion shaft 18 and the housing 12 (bearing preload torque) causes the U-shaped member 134 to rotate about the vertical axis 44 and react against the probe 190 of sensor 188 with a torque equivalent to bearing preload and thereby providing a signal output by sensor 188 which is proportional to the preload torque of the bearing set in the differential gear assembly. After a desired preload torque is achieved, air cylinders 132 are actuated lifting the platform 120 and U-shaped member 134, etc., off of the differential gear assembly 10 for repeating the process with yet another differential gear assembly.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art which this invention pertains and fall within the limits of the appended claims.

What is claimed is:

1. A process of preloading a set of antifriction bearings supporting a bearing shaft in a housing, the shaft having a threaded end adapted to threadingly receive a nut by rotating the nut in a clockwise direction as viewed from the shaft threaded end, a yoke coupled to the bearing shaft and adapted to rotate therewith, said process of preloading comprising the steps of:

rotatably driving the yoke and bearing shaft in a counterclockwise direction as viewed from the bearing shaft threaded end; and, selectively preventing the nut from rotating with the bearing shaft and thereby causing the nut to be threadingly received onto the bearing shaft and preloading the antifriction bearings.

2. The process of preloading a set of antifriction bearings of claim 1 further comprising the step of selectively allowing the nut to rotate with the bearing shaft in a counterclockwise direction and measuring the torque between the bearing shaft and housing.

3. The process of preloading a set of antifriction bearings of claim 1 wherein, during the step of preventing the nut from rotating, further comprising the step of measuring the torque being applied to the nut between the bearing shaft and the nut.

4. The process of preloading a set of antifriction bearings of claim 1, wherein said process is accomplished with a drive mechanism adapted to selectively engage and rotatably drive the yoke and bearing shaft in a counterclockwise direction as viewed from the bearing shaft threaded end, a dead shaft adapted to selectively engage and rotate with the nut, and a brake coupled to the dead shaft and adapted to selectively allow and prevent rotation of the dead shaft.

5. The process of preloading a set of antifriction bearings of claim 1 wherein the bearings shaft and housing are lifted causing a dead shaft to engage the nut and a drive mechanism to engage the yoke.

6. The process of preloading a set of antifriction bearings of claim 1 wherein a drive mechanism and a dead shaft are lifted onto and in engagement with the yoke and nut respectively.

7. A process of preloading a set of antifriction bearings supporting a bearing shaft in a housing, the shaft having a threaded end adapted to threadingly receive a nut by rotating the nut in a first direction as viewed from the shaft threaded end, a yoke coupled to the bearing shaft and adapted to rotate therewith, said process of preloading comprising the steps of:

rotatably driving the yoke and bearing shaft opposite said first direction as viewed from the bearing shaft threaded end; and, selectively preventing the nut from rotating with the bearing shaft and thereby causing the nut to be threadingly received onto the bearing shaft and preloading the antifriction bearings.

8. The process of preloading a set of antifriction bearings of claim 7 further comprising the step of selectively allowing the nut to rotate with the bearing shaft in said opposite direction and measuring the torque between the bearing shaft and housing.

9. The process of preloading a set of antifriction bearings of claim 7 wherein, during the step of preventing the nut from rotating, further comprising the step of measuring the torque being applied to the nut between the bearing shaft and the nut.

10. The process of preloading a set of antifriction bearings of claim 7, wherein said process is accomplished with a drive mechanism adapted to selectively engage and rotatably drive the yoke and bearing shaft in said opposite direction as viewed from the bearing shaft threaded end, a dead shaft adapted to selectively engage and rotate with the nut, and a brake coupled to the dead shaft and adapted to selectively allow and prevent rotation of the dead shaft.

11. The process of preloading a set of antifriction bearings of claim 7 wherein the bearings shaft and housing are lifted causing a dead shaft to engage the nut and a drive mechanism to engage the yoke.

12. The process of preloading a set of antifriction bearings of claim 7 wherein a drive mechanism and a dead shaft are lifted onto and in engagement with the yoke and nut respectively.

* * * * *

UNITED STATES PATENT AND TRADEMARK OFFICE
CERTIFICATE OF CORRECTION

PATENT NO. : 6,000,134
DATED : December 14, 1999
INVENTOR(S) : Jack V. Jerraid It is certified that error appears in the above-identified patent and that said Letters Patent is hereby corrected as shown below:

Col. 5, line 33, change "shiown" to --shown--
Col. 7, line 58, change "1 12" to --112--

Signed and Sealed this

Twentieth Day of June, 2000

Attest:

Q. TODD DICKINSON

*Attesting Officer*          *Director of Patents and Trademarks*